(12) United States Patent
Parkinson et al.

(10) Patent No.: US 12,056,174 B2
(45) Date of Patent: Aug. 6, 2024

(54) SYSTEM AND METHOD FOR IMPROVED CONTENT DISCOVERY

(71) Applicant: SKY CP LIMITED, Isleworth (GB)

(72) Inventors: Christopher Parkinson, Isleworth (GB); Joseph Boadi, Isleworth (GB); Jian Li, Isleworth (GB)

(73) Assignee: SKY CP LIMITED, Isleworth (GB)

( * ) Notice: Subject to any disclaimer, the term of this patent is extended or adjusted under 35 U.S.C. 154(b) by 0 days.

(21) Appl. No.: 17/274,181

(22) PCT Filed: Sep. 6, 2019

(86) PCT No.: PCT/GB2019/052495
§ 371 (c)(1),
(2) Date: Mar. 7, 2021

(87) PCT Pub. No.: WO2020/049317
PCT Pub. Date: Mar. 12, 2020

(65) Prior Publication Data
US 2021/0200799 A1   Jul. 1, 2021

(30) Foreign Application Priority Data

Sep. 7, 2018 (GB) ..................................... 1814605

(51) Int. Cl.
*G06F 16/483* (2019.01)
*G06F 16/38* (2019.01)
(Continued)

(52) U.S. Cl.
CPC ............ *G06F 16/38* (2019.01); *G06F 16/435* (2019.01); *G06F 16/438* (2019.01);
(Continued)

(58) Field of Classification Search
CPC .... G06F 16/483; G06F 16/435; G06F 16/438; G06F 16/9027; G06F 40/30; G06K 9/6215
See application file for complete search history.

(56) References Cited

U.S. PATENT DOCUMENTS 6,360,227 B1 * 3/2002 Aggarwal ............. G06F 16/954
707/999.005
9,052,942 B1 * 6/2015 Barber .................. G06F 3/0604
(Continued)

FOREIGN PATENT DOCUMENTS

WO  WO-2012092669 A1 *  7/2012 ............ G06F 16/211
WO      2014146265 A1     9/2014
(Continued)

OTHER PUBLICATIONS

International Search Report, PCT Application No. PCT/GB2019/052495, Dec. 3, 2020, 3 Pages.
(Continued)

*Primary Examiner* — Sherief Badawi
*Assistant Examiner* — Earl Elias
(74) *Attorney, Agent, or Firm* — Vorys, Sater, Seymour and Pease LLP; Khaled Shami

(57) ABSTRACT

Systems and methods for recommending content in a media system are described. In an embodiment, the method identifies a reference metadata tag associated with content in a database, retrieves a data structure storing information of learned associations between the reference metadata tag and a plurality of other metadata tags, the data structure defining a tree of nodes each associated with a corresponding metadata tag, a root node of the retrieved tree associated with the identified reference metadata tag. A path is extracted from the data structure, spanning from the reference metadata tag to a target metadata tag, the extracted path identifying a sequence of metadata tags defined by nodes along the (Continued)

extracted path. Recommended content items are returned based on the sequence of metadata tags identified by the extracted path.

20 Claims, 15 Drawing Sheets

(51) Int. Cl.
    *G06F 16/435*     (2019.01)
    *G06F 16/438*     (2019.01)
    *G06F 16/901*     (2019.01)
    *G06F 18/22*     (2023.01)
    *G06F 40/30*     (2020.01)
    *G06K 9/62*     (2022.01)

(52) U.S. Cl.
    CPC ........ *G06F 16/483* (2019.01); *G06F 16/9027* (2019.01); *G06F 18/22* (2023.01)

(56) References Cited

U.S. PATENT DOCUMENTS

| 2013/0151539 A1* | 6/2013 | Shi ...................... G06F 16/9536 707/754 |
| 2016/0179945 A1* | 6/2016 | Lastra Diaz .......... G06F 16/284 707/739 |
| 2019/0114550 A1* | 4/2019 | Hölzl ....................... G06N 5/04 |

FOREIGN PATENT DOCUMENTS

| WO | WO-2014146265 A1 * | 9/2014 | ....... G06F 17/30327 |
| WO | WO-2018218184 A1 * | 11/2018 | ....... G06F 16/90332 |
| WO | WO-2019043352 A1 * | 3/2019 | ............ G06F 16/22 |

OTHER PUBLICATIONS

Written Opinion, PCT Application No. PCT/GB2019/052495, Dec. 3, 2020, 8 Pages.

* cited by examiner

FIG. 13

People Also Watched
Collaborative Filtering for Movies

FIG. 14

SYSTEM AND METHOD FOR IMPROVED CONTENT DISCOVERY

CROSS-REFERENCE TO RELAYED APPLICATIONS

This application is a National Phase of the International Application No. PCT/GB2019/052495 filed on Sep. 6, 2019, which is based on GB 1814605.0 filed on Sep. 7, 2018, the disclosure of which is incorporated herein by reference in its entirety.

FIELD OF THE INVENTION

This invention relates generally to a media system, and more particularly to systems and methods employing machine learning for generating recommended content items.

BACKGROUND

Content discovery is one kind of service that helps users to find and explore multi-media items from content providers in order to meet users' needs. There are generally two ways of machine-assisted discovery of recommended content items for users. First, typical search services provide users the capability of retrieving the content items that users are looking for, based on input search criteria. Second, typical media recommendation services provide the capability of identifying content items that can be relevant to users' needs and suggesting identified content items to users as recommendations rather than in response to direct user requests.

However, conventional functionality typically relied on an assumption that the user is seeking content that is similar to another content item or search term. For example, to create a movie recommendation system, one simple approach is to find a list of movies having similar plots or stories to a movie a customer has watched, where plot/story similarity is predefined by a dictionary of affinities between content description or metadata such as tags or concepts in a semantic context. An alternative approach for recommendation is finding movies watched by a set of customers who have similar movie viewing behaviours or personal taste preference to a customer. However, in practice, it has been widely noticed that such conventional platforms suffer from problems with narrow, constricted and/or inflexible recommendation scopes, and are generally insufficient when addressing a key challenge of providing users with surprising and inspiring recommendations. What is desired are better systems and methods that do not suffer from the above issues and provide for broader content discovery capability.

SUMMARY OF THE INVENTION

The following is a brief summary of subject matter that is described in greater detail herein. This summary is not intended to be limiting as to the scope of the claims. Described herein are various technologies pertaining to automatic content recommendation. In one aspect, the present invention provides a method of producing a plurality of content options, by processing a query for one or more content items, the query identifying a reference metadata tag of the content; determining a sequence of metadata tags that span from the reference metadata tag to a target metadata tag, using a data model that defines a computed association between each pair of metadata tags in the sequence; and identifying a plurality of content items from the database based on the determined sequence of metadata tags.

In another aspect, the proposed technique uses machine learning to learn semantic flow knowledge, i.e., how semantics evolves from one concept or tag to another. This is achieved by learning inter-connections between semantic concepts/tags, forming a semantic tree representation. Semantic tree is a visual representation of the semantic flow knowledge. In the semantic tree representation, the root of the tree is the reference tag. All other tags from a fixed tag vocabulary are represented in the leaves of the tree spreading multiple layers of the tree hierarchical structure. While tags in a direct linked pair of parent-child nodes are representative of semantic relevance or similarity, the semantics of tags evolves or changes gradually when traversing a semantic tree from root node tag to any other tag in the deeper layers of the tree hierarchy. The semantic evolution along the semantic tree hierarchy is defined as semantic flow. In yet another aspect, a semantic path exists between the reference tag in the root node and any other tag in the semantic tree. This novel idea enables meaningful measurement of semantic distance between any pair of tags: the longer distance of a semantic path between a pair of tags is, the stronger semantic dissimilarity the pair of tags delivers, and vice versa. In yet another aspect, the semantic tree representation is used to provide content recommendations related to semantic concepts/tags that span two semantically different/contrasting end-points. A semantic path is defined through the semantic tree from a source tag to a target tag and represents the semantic evolution and change over concepts. Content associated with each hop along the semantic path can then be output as recommendations/suggestions to the user, and the semantic evolution ensures the plurality/diversity of recommended contents.

A resulting plurality of recommended media content items may be output in an electronic program guide, to facilitate user input of a selected recommended media content item for retrieval from a content service provider.

Further advantageously, the exemplary embodiments described below facilitate a better search and recommendation platform which is less prone to search space localisation and covers a wider content diversity, thereby increasing the relevancy level of recommendations.

Other aspects will be appreciated upon reading and understanding the attached figures and description.

BRIEF DESCRIPTION OF THE DRAWINGS

There now follows, by way of example only, a detailed description of embodiments of the present invention, with references to the figures identified below.

FIGS. 13 and 14 show respective exemplary screenshots of recommendation services in alternative implementation contexts.

DESCRIPTION OF EMBODIMENTS

Specific embodiments of the invention will now be described, directed to a computer-implemented system for discovering content, such as movies, television episodes, songs, podcasts, e-books, video games, software applications, and the like. The system uses machine learning technology to learn semantic affinities among a corpus of unique metadata tags associated with content in a database, and to train a semantic flow data model for use in addressing a problem of providing improved retrieval coverage of likely associated content when resolving queries for recommended content.

Figure 1:
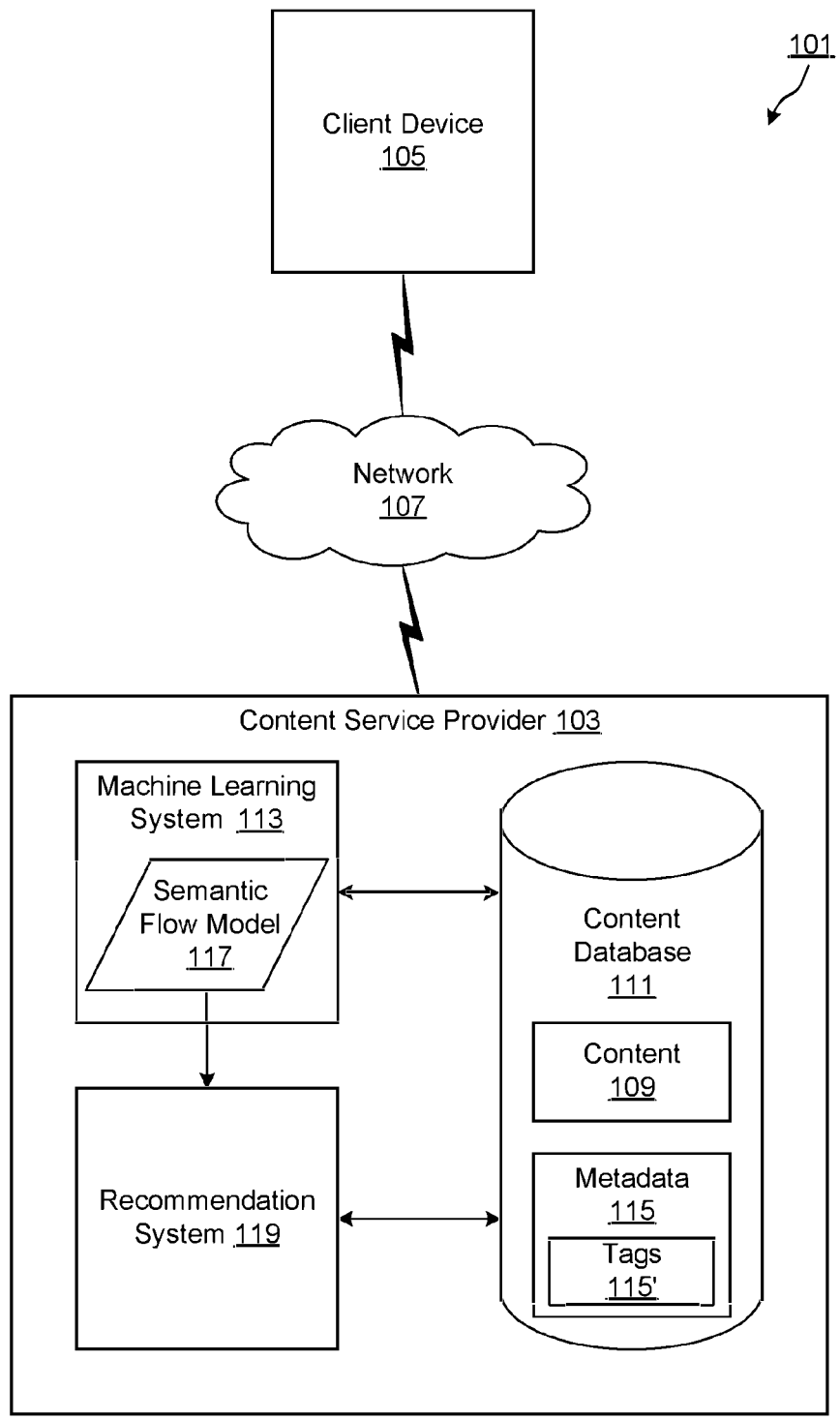
FIG. 1 is a data flow block diagram showing the main components of a content discovery system within a content discovery environment, according to an exemplary embodiment of the invention.

FIG. 1 shows schematically the main components of an exemplary content discovery environment 101 that is operable to employ embodiments of the present invention. The illustrated environment 101 includes a content service provider 103 in data communication with a client device 105 via a data network 107. The content service provider 103 may be implemented as one or more servers providing one or more network services that relate to content 109 in one or more databases 111. The network services can include broadcasting and/or streaming the content 109 via the network 107 for output by the client device 105, making the content 109 available for download, managing purchased content and/or content subscriptions, and so on.

The client device 105 may be implemented as a variety of different computing devices. For example, the client device 105 may be one or more computing devices such as a set top box (STB) receiver and display, a personal computer, a laptop, a smart phone, a tablet computer, a game console and display, a handheld game console, and the like. The network 107 may be any suitable data communication network or combination of networks. For example, the network 107 may include a wireless network, a local-, wide-, or personal-area network, an intranet, the Internet, a public telephone network, and the like.

The content service provider 103 of an exemplary embodiment includes a machine learning system 113 that is configured to process metadata 115 describing each item of content 109 that is to available via the content service provider 103, and generate a semantic flow model 117 that defines and/or encodes learned associations between metadata tags. The content service provider 103 also includes a recommendation system 119 that is configured to use the semantic flow model 117 to determine one or multiple sequences of associated metadata tags stemming from one reference tag or multiple reference tags, for automated content recommendation. The exemplary embodiments are described with particular reference to which entity may perform a particular process, but this is purely by way of example and other architectures may be used within the scope of the invention. For example, some or all of the processing functionality of the machine learning system 113 and the recommendation system 119 may be provided in the, or each, client device 105. In such an arrangement, training of the semantic flow model 117 may be distributed among client devices 105 of the environment 101, and respective recommendation system 119 of each client device 105 can be configured to process a recommendation query using a local stored copy of the semantic flow model 117, without requiring data communication with the content service provider 103 to resolve the query. Alternatively, or additionally, each client device 105 may be configured to transmit a recommendation query to the content service provider 103, for processing by the recommendation system 119 of the content service provider 103.

The content database 111 can include the metadata 115 of items in the database, typically in a defined structure including metadata tag categories such as title, genres, actors, director, content descriptions or concepts, and the like. Alternatively or additionally, the machine learning system 113 may obtain the metadata 115 from an external data source (not shown). This metadata 115 is processed by the machine learning system 113 to generate the semantic flow model 117, for example based on learned associations between pairs of unique metadata tags in a category. The semantic flow model 117 is used by the recommendation system 119 to determine one or multiple sequences of other available content items 109 that stem from one or multiple pairs of reference-target metadata tags. This may include determining a sequence of metadata tags that span from the reference metadata tag to a target metadata tag, each pair of metadata tags in the sequence having a computed association defined by the semantic flow model 117. The target metadata tag may be specified by query from client device 105, selected from metadata of the same content as the reference tag, or computed as the tag that is least similar, or most dissimilar, to the reference metadata tag in a semantic tree.

It should be appreciated that the content service provider 103 and client device 105 may each include other components, sub-components, modules, and devices commonly found in a computing system/device, which are not illustrated in FIG. 1 for clarity of the description.

Figure 2:
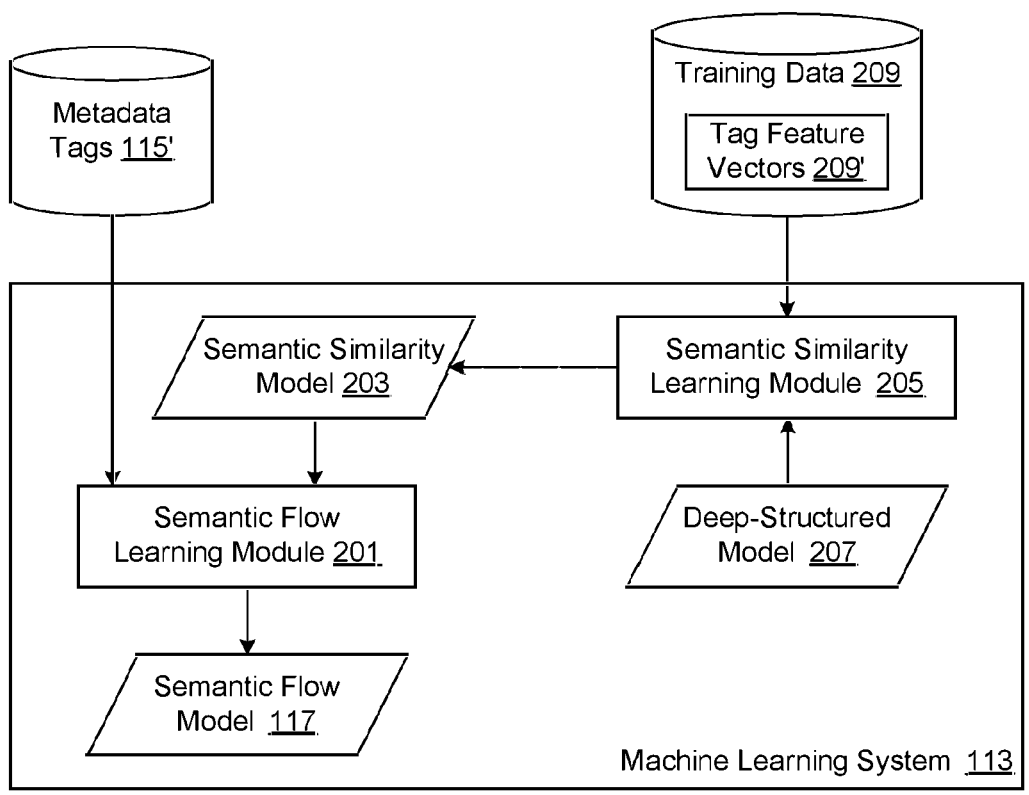
FIG. 2 is a data flow block diagram of the machine learning system of FIG. 1 in greater detail.
Figure 3:
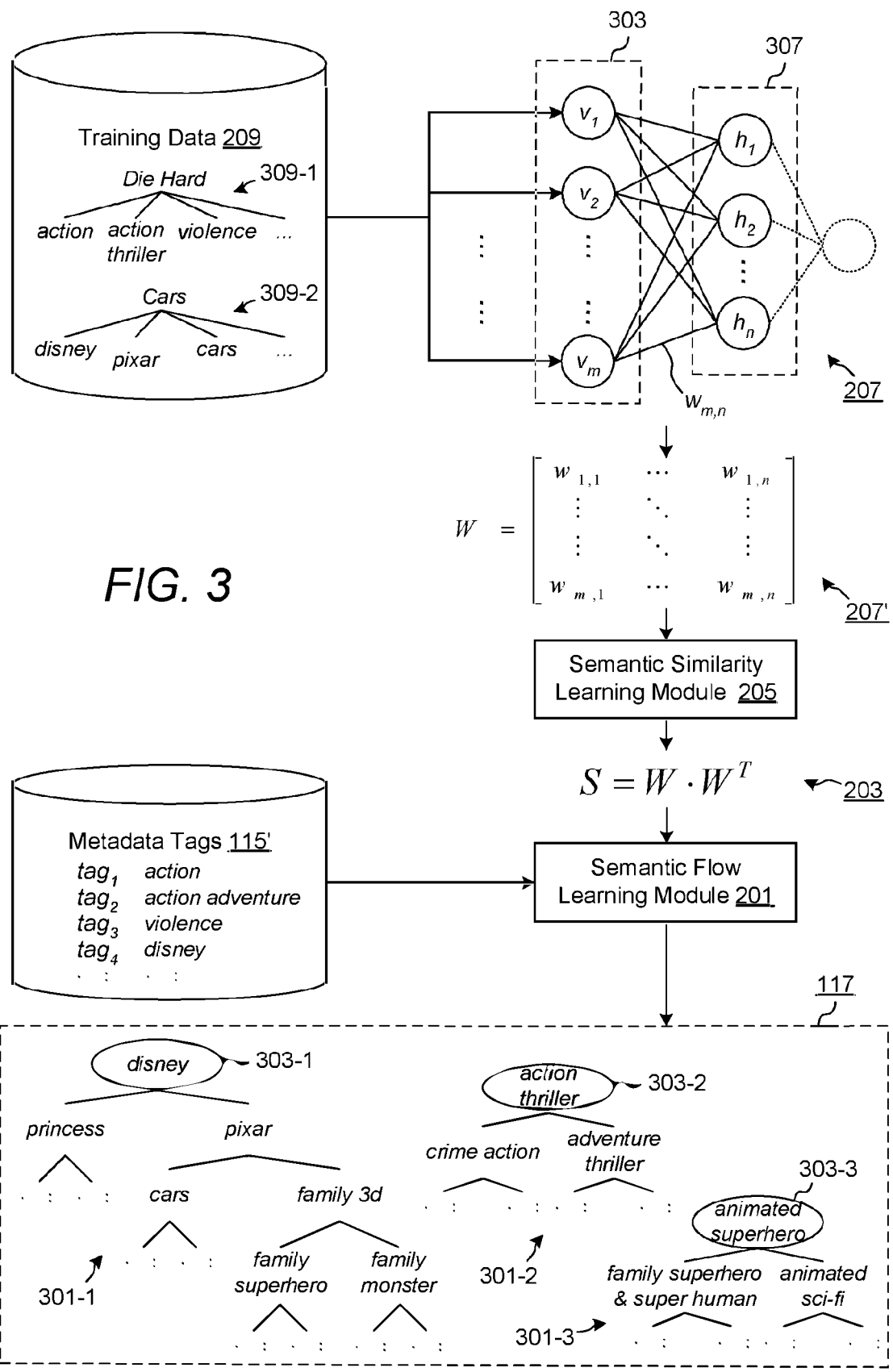
FIG. 3 is a schematic illustration of a worked example accompanying the data flow block diagram of FIG. 2.

FIG. 2 is a schematic diagram of the machine learning system 113 of FIG. 1 in greater detail. Reference is also made to FIG. 3, schematically illustrating an accompanying worked example. The machine learning system 113 includes a semantic flow learning module 201 that facilitates training of the semantic flow model 117, for subsequent use by the recommendation system 119 to resolve queries for recommended content. The data structure of the semantic flow model 117 defines associations between every pair of unique metadata tags 115' of the media content, given a particular reference context. Referring to the example shown in FIG. 3, if there are m unique semantic tags in the metadata tag set 115', the semantic flow model 117 comprises m trees 301, each stemming from a respective reference node 303 identifying a corresponding one of the set of unique semantic tags 115'. The exemplary trees 301 shown in the worked examples are binary trees, but it is to be appreciated that a greater number of child nodes may be defined for each parent node of the hierarchical data structure. Each tree 301 defines a structured representation of affinity between the reference semantic tag 303 and each other unique semantic tag 115' of the content in the database 111. The semantic flow learning module 201 generates each tree 301 of the semantic flow model 117 based on calculated similarities between pairs of tags in the semantic context. The calculated similarities may be a probability that two metadata tags 115' are similar, computed using a semantic similarity data model 203 trained by a semantic similarity learning module 205. The number of depth levels or hops from the reference metadata tag 303 to any one of the other metadata tags in the tree 301 may be representative of a degree of similarity, or dissimilarity, between the two tags, in the context of the reference tag 303. Additionally or alternatively, the degree of similarity, or dissimilarity between one reference tag and one target tag may be calculated as the sum of computed affinities between each pair of metadata tags along a path linking the reference tag and the target tag through the semantic flow model 117.

In the present exemplary embodiment, the semantic similarity learning module 205 of the machine learning system 113 receives a deep-structured model 207, such as an artificial neural network model. Referring again to the example shown in FIG. 3, the deep-structured model 207 is preferably based on a Restricted Boltzmann Machine (RBM), which is a generative, auto-encoding, stochastic artificial neural network that can learn a probability distribution over a set of inputs. The RBM is a particular type of Boltzmann machine and Markov random field (MRF) that has one layer of visible input nodes 303 and one layer of hidden nodes 307 forming a bipartite graph. The visible and hidden nodes of an RBM are typically binary-valued units, such as Boolean or Bernoulli stochastic units, each pair of nodes from the input layer 303 and the hidden layer 307 having a symmetric connection between them, with no connections between nodes within a layer. The data structure defining the deep-structured model 207 consists of a matrix 207' of weights W of size m by n, where m is the number of visible nodes 303 and n is the number of hidden nodes 307. Each weight $w_{i,j}$ is associated with the connection between a respective pair of visible $v_i$ and hidden $h_j$ nodes, as well as bias weights (offsets) for the visible and hidden nodes. In the illustrated example, the m input nodes 303 of the deep-structured model 207 each correspond to a respective one of a set of m unique metadata tags 115' identifying items 109 in the content database 111. Preferably, the number of visible input nodes 303 is greater than the number of hidden nodes 307. Advantageously, this avoids the likelihood of the trained hidden nodes simply mirroring the visible nodes, and also reduces computational complexity.

The deep-structured model 207 can be generated by a pre-training procedure, followed by optimisation of the weights and node biases of the deep-structured model 207, through sequential or full-sequence learning by the semantic similarity learning module 205. As shown, the semantic similarity learning module 205 in this exemplary embodiment accesses training data 209 to perform training of the deep-structured model 207. The data structure of each training sample 209 can consist of a feature vector based on unique metadata tags 115' in the content database 111 corresponding to an item in the content database 111. For example, the feature vector may consist of binary values each representative of the presence of a corresponding one of the set of unique metadata tags 115' as defined for the content item 109. FIG. 3 shows two exemplary training samples 309, in this case movie content items from the database 111, each having a respective plurality of pre-defined associated metadata tags 115'. The set of metadata tags 115' may be defined as an ordered data structure identifying each unique tag in the set, such as ["action", "action adventure", "violence", "disney", "pixar", "cars", . . . ]. The corresponding tag feature vector for the movie "Die Hard" would be [1, 1, 1, 0, 0, 0, . . . ], indicating that this training sample 309-1 is associated with metadata tags at positions 1, 2 and 3 in the ordered list. Similarly, the exemplary feature vector for the training sample 309-2 for the movie "Cars" would be [0, 0, 0, 1, 1, 1, . . . ].

Figure 4:
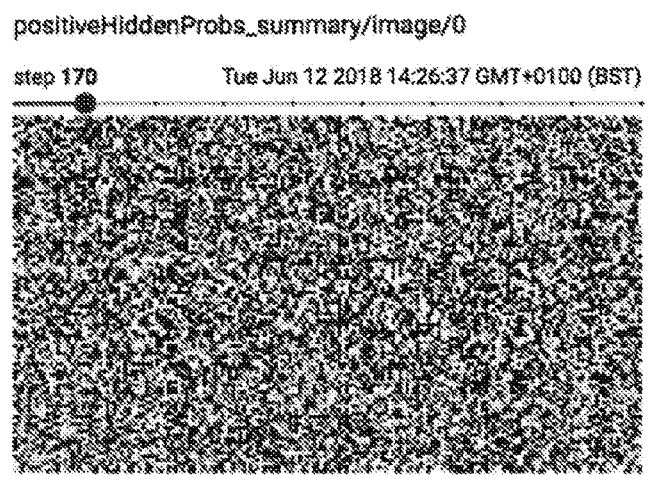
FIG. 4 shows an exemplary plot visualising the model weights learned by the proposed machine learning model.

Any suitable training algorithm may be used to optimise the weight matrix 207' of the trained deep-structured model 207 based on the training samples 209'. By training the deep-structured model 207 with such a training set 209, the resulting model parameters more accurately reflect the inter-relationships between all pairs of input tags across the entire context space, rather than merely learning similarity simply based on tag co-occurrence. For example, when the model training is started, parameters of the weight matrix W may be initiated with random values. As training steps proceed, the parameters of the weight matrix W will be updated to reflect the nonlinear structure of responses of each hidden unit to each of the observation unit in the model structure 207. FIG. 4 shows an exemplary plot of the probabilities of each hidden unit activating for each tag in a training batch. In this 2-dimensional representation, the horizontal dimension represents all the visible units (tags) and the vertical dimension represents all the hidden units. The value at any position of this figure represents the probability of the corresponding hidden unit being activated when the corresponding observation unit is activated. It is evident that activation patterns between hidden units and observation units are well-learned using the training algorithm. In this way, the trained model 207 can be used to compute similarity of a target feature vector against the hidden unit probability feature vectors for all other observation units, by specifying an observation unit as a target and extracting the associated hidden unit activity probabilities as a feature vector. Following this procedure, all the observation units can be ranked by such similarity scores and the most similar observation unit to the target observation unit can be determined.

In this exemplary embodiment, the output layer of the deep-structured model 207 is not used in the conventional manner. Instead, the semantic similarity learning module 205 computes a semantic similarity data model 203 that defines a relationship between the weight matrix W and the conditional probability $P(p_i|p_j)$ that a particular reference tag $p_i$ exists in the same content context as another tag $p_j$. The data structure of the semantic similarity data model 203 is computed as the matrix 207' of trained weights W multiplied by its transpose $W^T$, resulting in a matrix S of size m by m storing probability values indicative of semantically similar or relevance between every pair of unique tags 115'. In this way, the machine learning system 113 effectively learns a compressed data structure of all semantic relationships between metadata tags in the set 115'. The learned semantic similarity data model 203 can be used to output a state posterior probability value representing the probability of similarity of a reference metadata tag to any one of the other unique metadata tags in the set 115'. The weight matrix 207' of the trained deep-structured model 207 may be further optimised by iterative re-training using new and/or updated data sets.

Figure 5:
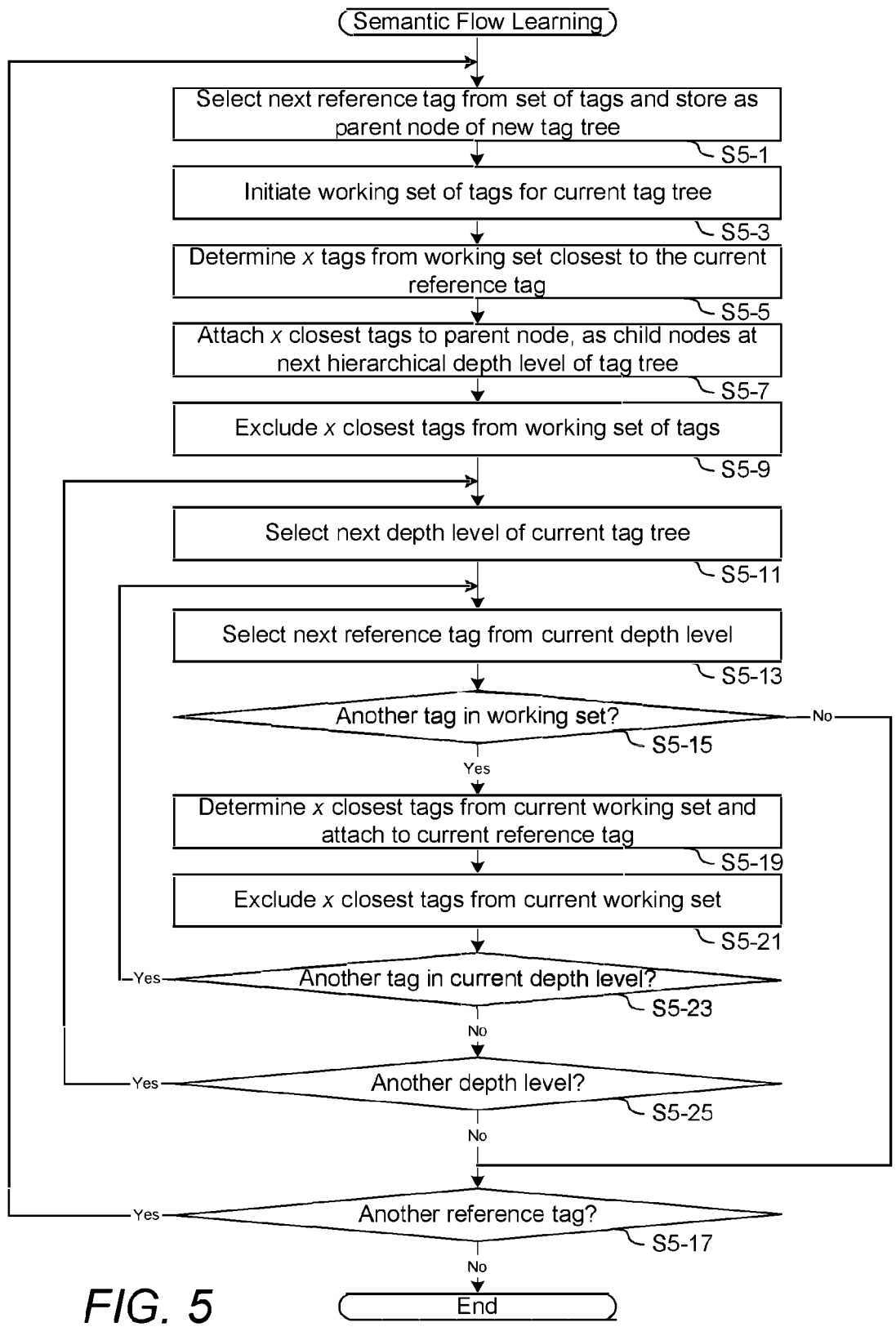
FIG. 5 is a flow diagram illustrating the main processing steps of a semantic flow learning process performed by the machine learning system shown in FIGS. 1 and 2, according to an embodiment.

FIG. 5 is a flow diagram illustrating a computer-implemented training process to generate a semantic flow data model 117 for inferring outputs to data queries for recommended content items, using a semantic flow learning module 201 in accordance with another embodiment. As shown, the process begins at step S5-1 where the semantic flow learning module 201 selects a first tag as the current reference tag 303 from a set of unique metadata tags 115' associated with content items 115 in the database 111. The current reference tag is stored as a parent node 303 of a new tag tree data sub-structure 301 of the semantic flow model 117. At step S5-3 the semantic flow learning module 201 initiates a working set of the other unique metadata tags 115' that are to be added as child nodes of the current tag tree 301. At step S5-5, the semantic flow learning module 201 determines x tags from the set of unique tags 115' that are closest to the current reference tag, where x is a predefined number of child nodes to be attached to each node in the hierarchical data structure. The closest tags can be determined based on the computed similarity probabilities stored in the trained semantic similarity model 203, for example by identifying the x semantic tags 115' from the remaining tags in the set having the greatest affinity to the current reference tag 303. At step S5-7, the semantic flow learning module 201 attaches the identified closest tags as the first depth level of child nodes to the parent node 303 of the current tag tree 301. At step S5-9, the identified closest tags are removed from the current working set of metadata tags 115'.

At step S5-11, the semantic flow learning module 201 moves to the next depth level of child nodes to be processed from the current tag tree 301, this being the first level of child nodes attached to the parent node 303 at step S5-7. At step S5-13, the semantic flow learning module 201 selects the metadata tag 115' of the first child node from the current depth level as the next reference tag to be processed. At step S5-15, the semantic flow learning module 201 determines if there is another semantic tag 115' in the current working set of tags to be added to the current tag tree 301. If it is determined at step S5-15 that all of the unique semantic tags 15' have been added to the current tree, the semantic flow learning module 201 determines at step S5-17 if there is another unique reference tag 115' to be processed for tag tree generation, where processing returns to step S5-1 for the next reference tag. On the other hand, when it is determined at step S5-15 that there are candidate reference tags remaining in the current working set, then at step S5-19, the semantic flow learning module 201 again determines x other tags from the remaining unique tags 115' in the current working set that are closest to the current selected reference tag 115', and attaches the identified closest tags as a next hierarchical depth level of child nodes to the current child node 303 of the current tag tree 301, in a similar manner to steps S5-5 and S5-7. At step S5-21, the identified closest tags from step S5-19 are removed from the current working set of metadata tags.

At step S5-23, the semantic flow learning module 201 determines if there is another child node to be processed from the current depth level, and steps S5-11 to S5-21 are repeated for each remaining child node at the current depth level. Once all of the child nodes at the current depth level are processed, the semantic flow learning module 201 determines at step S5-25 if there is another depth level of child nodes to be processed. If a new depth level of child nodes was added at step S5-19, then processing returns to step S5-11 to repeat steps S5-13 to S5-21 for the next selected depth level of child nodes. On the other hand, processing of the current tag tree ends when the semantic flow learning module 201 determines at step S5-21 that there are no further depth levels of child nodes to be processed. Processing continues to step S5-17 as discussed above, where the semantic flow learning module 201 determines if there is another unique reference tag 115' to be processed for tag tree generation. The semantic flow learning process ends when a tag tree data structure 301 has been generated for each unique reference tag 115' in the database 111. In this way, each tag tree data sub-structure of the learned semantic flow model 117 stores a hierarchical arrangement of the set of unique metadata tags 115' stemming from a parent reference tag, each tag appearing exactly once in the tag tree. It is to be appreciated that paths through the respective tag trees are not symmetric, as the path from example tags $t_a$ to $t_b$ may have no tags in common with the path from $t_b$ to $t_a$, except for the end nodes themselves, since each semantic tag tree is defined in the context reference of a respective reference source tag. The semantic flow data model 117 may be updated or retrained responsive to changes to the trained deep-structured model 207.

Figure 6:
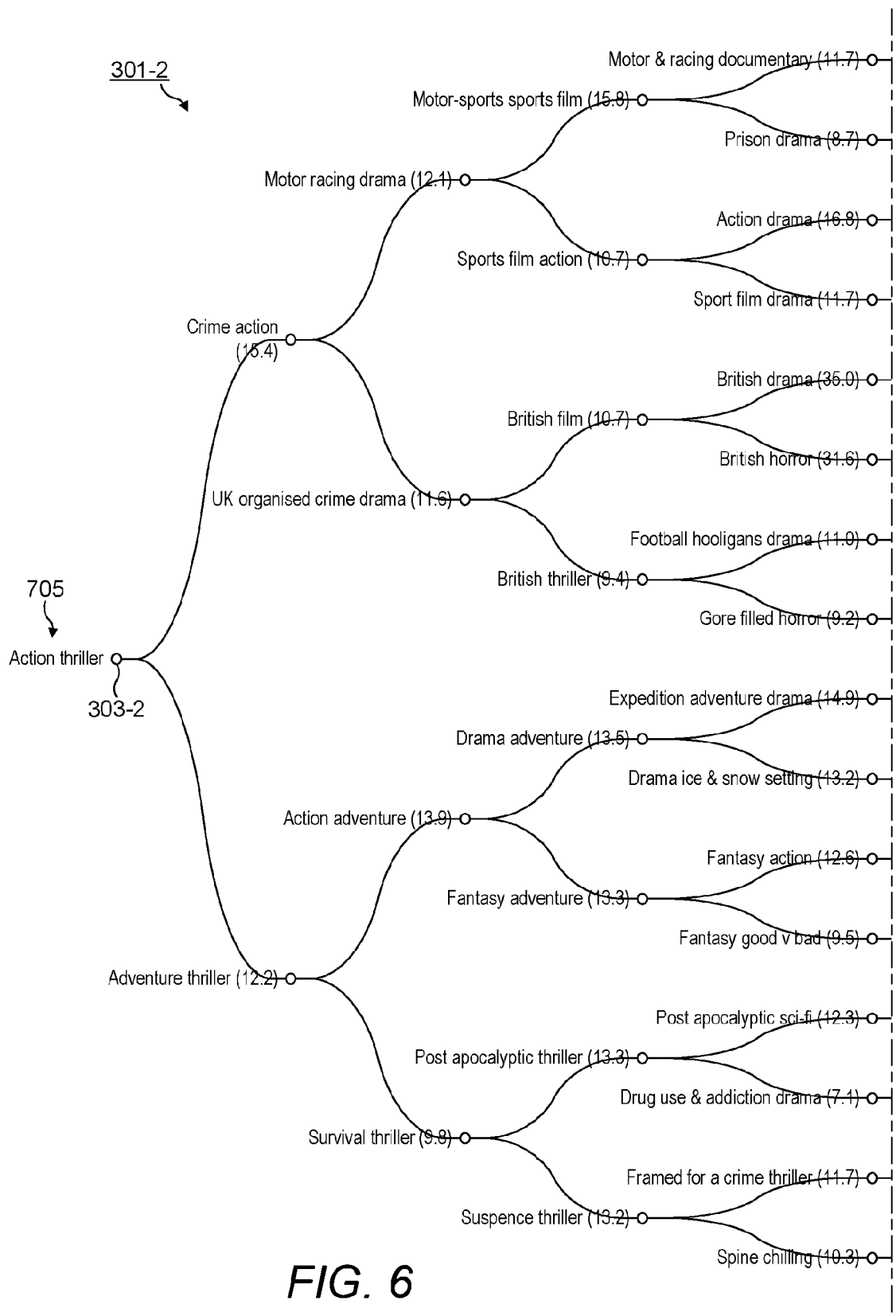
FIG. 6 shows an exemplary plot of semantic tree structure for a specified source tag, learned by the machine learning model.
Figure 6:
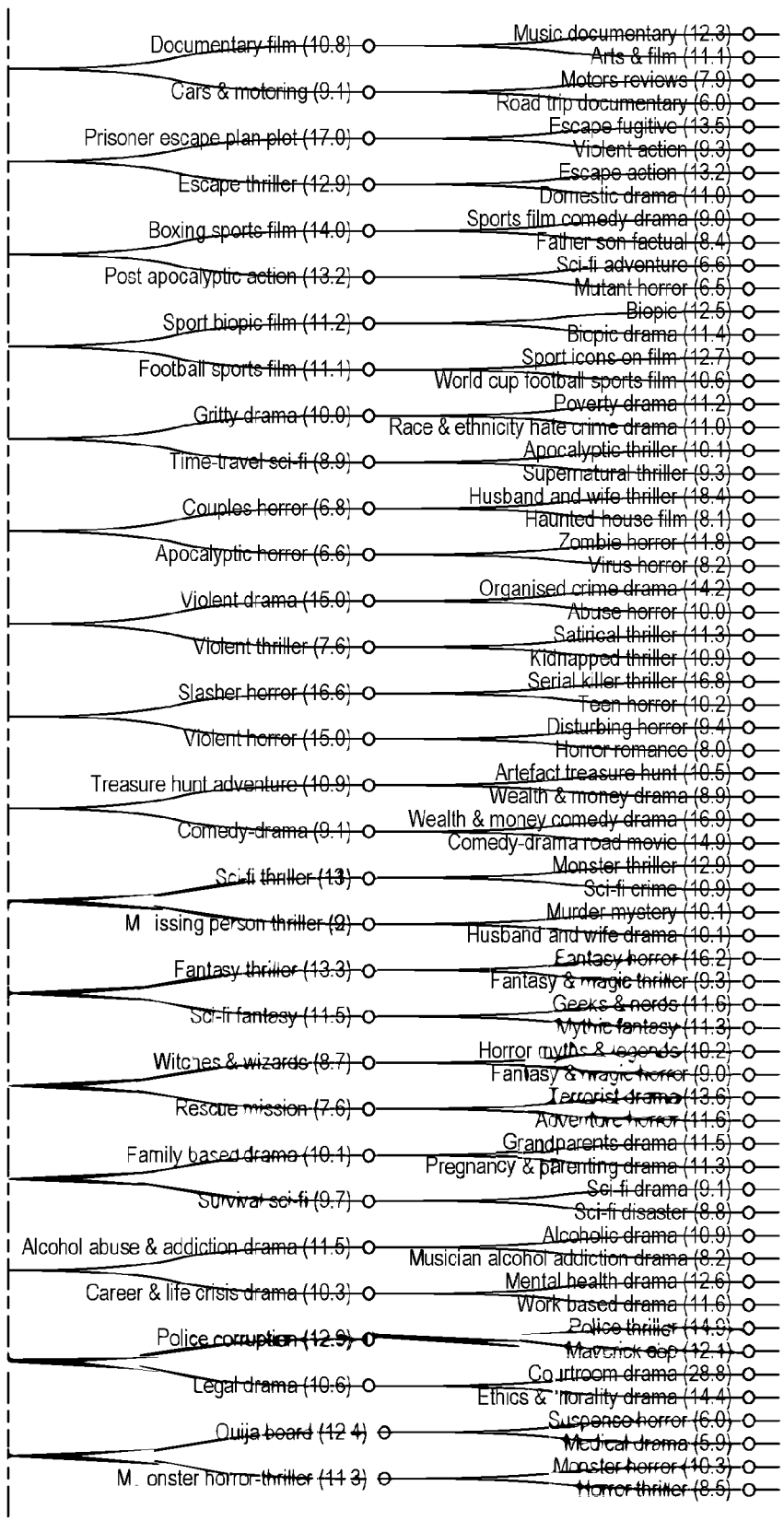

FIG. 6 shows an example of a learned semantic flow tree 301-2 given a source node 303-2 corresponding to the reference tag "action thriller" 705. In this example, every parent node has two children nodes and only the first seven layers of the tree is shown due to limit of space. As shown, the two tags "crime action" and "adventure thriller" are most semantically similar to the reference tag "action thriller", as learned by the semantic similarity learning module 205. Moving to the second layer, the semantic similarity learning module 205 learns that tags "motors & racing drama" and "uk organised crime drama" are most similar tags to the parent tag "crime action", and tags "action adventure" and "survival thriller" are most similar tags to the parent tag "adventure thriller". As this process is repeated for all available tags 115', a semantic tree 301 is built linking the reference tag in the root node 303-2 and all other tags in the tag vocabulary. A semantic tree 301 can be used for learning evolution of semantic concepts. When traversing the tree 301 from the root 303, there are paths linking the root tag with any other tag, and every path represents a journey of semantic evolution. For example, the tags "action thriller" and "sci-fi adventure" are linked through tags "crime action", "motors & racing drama", "sport film action", "action drama" and "post apocalyptic action". In this semantic path, the concepts change first from crime to sport action, then to action drama and finally to sci-fi action and adventure. Although the reference tag "action thriller" and target tag "sci-fi adventure" are quite different in semantic meanings, the semantic tree is able to learn and identify a meaningful path that links these two concepts together.

Figure 7:
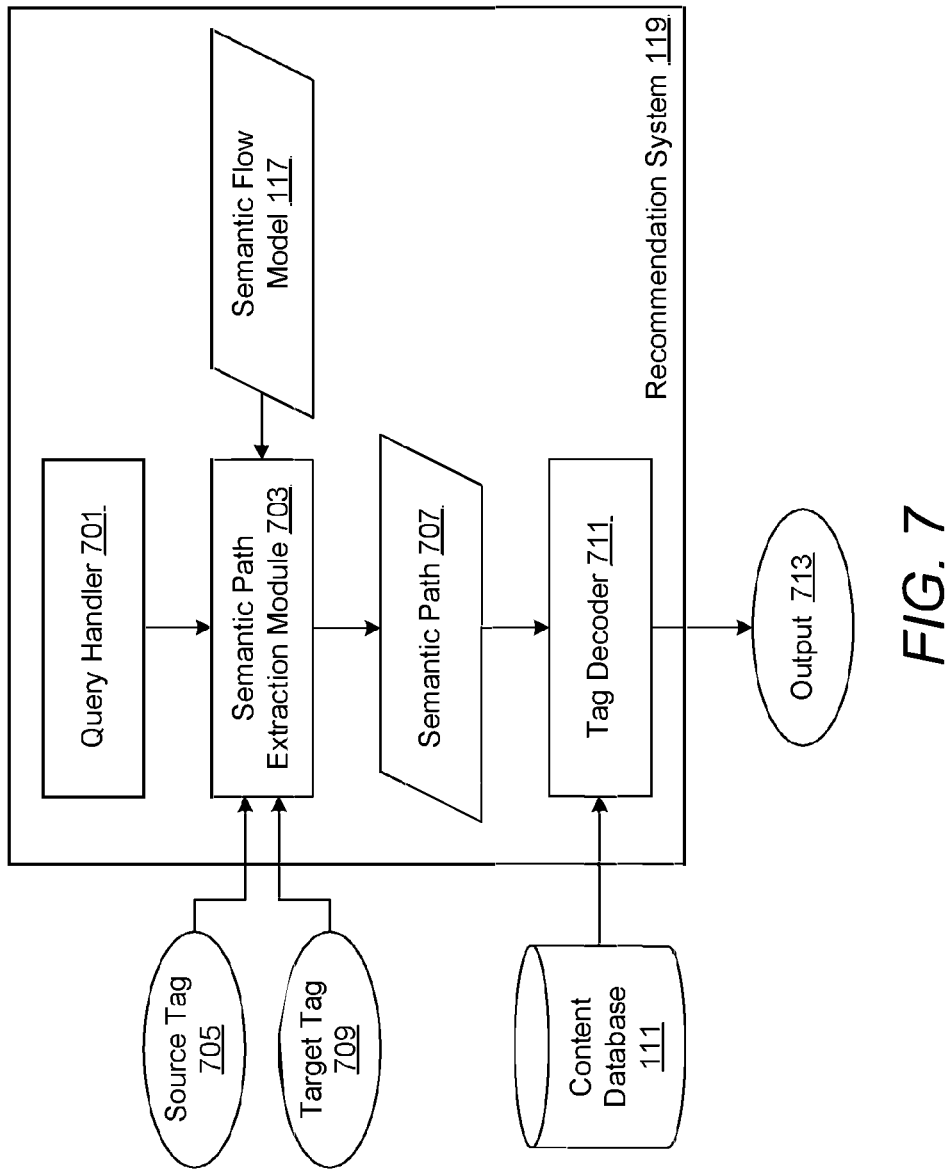
FIG. 7 is a data flow block diagram of the recommendation system of FIG. 1 in greater detail.
Figure 8:
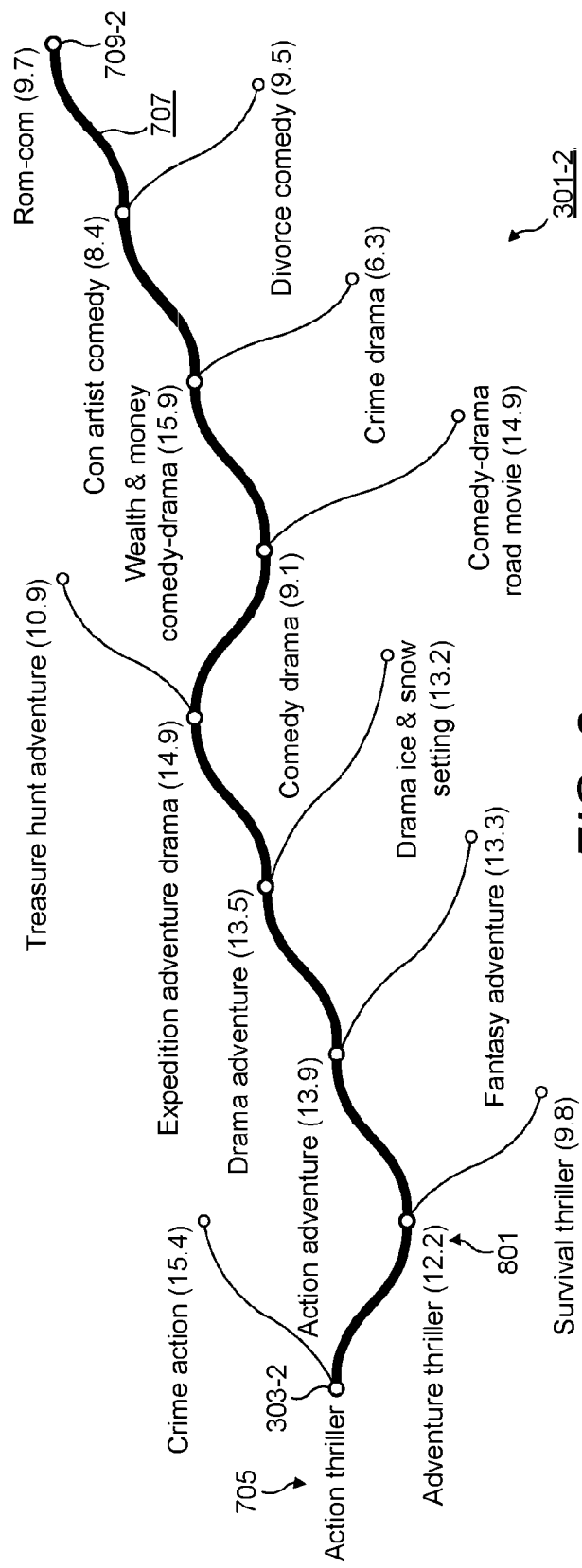
FIGS. 8 and 9 are schematic illustrations of worked examples accompanying the data flow block diagram of FIG. 7.

FIG. 7 is a schematic diagram of the recommendation system 119 of FIG. 1 in greater detail. Reference is also made to FIG. 8, schematically illustrating an accompanying worked example. The recommendation system 119 can use the semantic flow model 117 generated by the machine learning system 113 to resolve queries for recommended content in a variety of implementation contexts. For example, the recommendation system 119 may respond to a search service enquiry identifying input search criteria defining and/or associated with one or more metadata tags 115'. As another example, the recommendation system 119 may respond to a service call to determine recommended content items based on one or more identified content items.

As shown, the recommendation system 119 includes a query handler 701 that receives a query for recommended content, for example from a client device 105, or from another processing module of the content service provider 103 such as a content scheduler. Alternatively, the query handler 701 may be configured to generate the query for recommended content. The recommendation system 119 also includes a semantic path extraction module 703 that receives a source tag 705, for example as defined in a query from the query handler 701. The source tag 705 can be selected from the set of unique metadata tags 115', or can be a mapping of an input term to one of the unique metadata tags 115'. One or more source tags 705 may instead be derived from a content identifier provided as a query parameter. A target tag can be determined in different ways. As one example, a target tag can be automatically identified from a semantic tree as the tag which is the least similar, or most dissimilar, to the identified source tag. As another example, a target tag can be collected from query handler 701, either specified explicitly from a customer or identified from tag set associated with a content in query. The semantic path extraction module 703 determines a semantic path 707 stemming from the received source tag 705, the data structure of the semantic path 707 consisting a sequence of metadata tags 115' forming a path that links the source tag 705 to a target tag 709. The data structure also stores, for each pair of adjacent tags in the sequence, a corresponding affinity in the semantic context as learned by the machine learning system 113. For example, as shown in the example of FIG. 8, the learned semantic similarity model 207 can be used to output a relevancy value 801 of "12.2" given the input tags "action thriller" and "adventure thriller", representing the score that is proportional to the probability that the reference metadata tag "action thriller" 705 exists in the same content context as the metadata tag "adventure thriller".

The recommendation system 119 can determine, for a received query identifying a reference metadata tag 115' as the source tag 705, a target metadata tag 709 that is least similar, or most dissimilar, to the identified source tag 705. For example, the target metadata tag 709 can be determined as the root node of the source tag tree 301 that is furthest from the parent node 302, in terms of depth levels and/or sum of computed affinities between each pair of metadata tags along a path through the tag tree 301. Advantageously, this enables the recommendation system 119 to provide a broader content discovery capability by systematically locating content beyond the traditional search space that is focussed and localised around content that is similar to what the user has watched before and/or indicated as preferences. Alternatively or additionally, the target tag 709 may also be identified or derived from the received query parameters. The semantic path extraction module 703 determines a sequence of metadata tags 115' linking the source and target tags, using the data sub-structure 301 of the semantic flow model 117 having a parent node 303 corresponding to the reference source tag 705. FIG. 8 shows a portion of the exemplary tree 301-2 of the semantic flow model 117 for the source metadata tag "action thriller". In this illustrated example, a target tag "rom-com" 709-2 is specified from query handler 701. The objective of this processing stage is to identify how the two concepts "action thriller" and "rom-com" are linked and evolved in the context of semantic flow model. The semantic path extraction module 703 can determine the sequence of metadata tags 115' by traversing a path 707 through the identified tree, starting from the parent node 303 and ending with the root node corresponding to the target tag 709-2. Each pair of adjacent metadata tags 115' in the extracted semantic path 707 therefore has a learned affinity association encoded by the semantic flow model 117, with the sequence of nodes in the path effectively ordered from most similar to least similar to the reference source tag 705.

Figure 9:
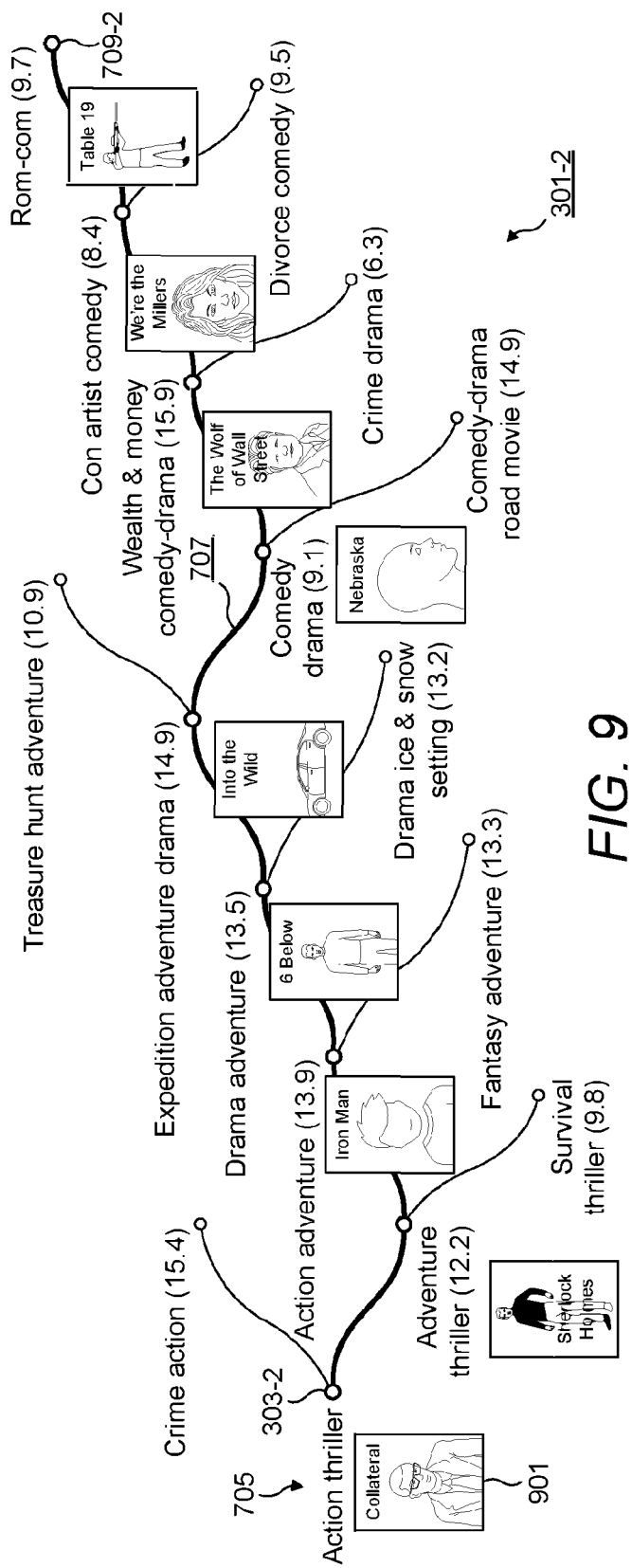

The recommendation system 119 additionally includes a tag decoder 711, which can decode the extracted semantic path 707 to generate an output 713. For example, the tag decoder 711 can identify, for each node along the extracted semantic path 707, one or more candidate content items 109 from the database 111 associated with the respective metadata tag 115' of that node. The output 713 can include metadata 115 associated with the one or more identified content items 109 as content recommendations. FIG. 9 illustrates an example of content recommendation results corresponding to nodes of the identified semantic path 707 shown in FIG. 8, linking the source tag "action thriller" to the target tag "rom-com". For each node along the path 707, the tag decoder 511 can identify a recommended movie associated with the corresponding metadata tag 115' and retrieve metadata 115 such as the movie cover art 901, for output to the user. The output 713 can also include one or more elements of a user interface enabling a user to select a recommended content item for retrieval from the content database 111. In this way, the improved recommendation system 119 addresses the challenge of providing users with surprising and inspiring recommendations.

The recommendation system 119 can be deployed in a variety of media content transmission contexts including both broadcast video content, via a broadcast channel, and video-on-demand (VOD) content, via a data network such as the Internet, to a media client. For example, the recommendation system 119 can be deployed in a content distribution server, such that content distribution server can act to determine and output content recommendations responsive to received queries. In another example, the recommendation system 119 can be deployed in the media client, such as a set-top box, personal media player, smart phone, tablet or desktop computer, Internet TV device and the like, such that the media client can act responsive to user interaction to determine and output content recommendations.

Furthermore, the recommendation system 119 may respond to interaction with a user interface of the media client, such as an electronic program guide, for example to instruct a search query for a media content item, or navigation to and/or selection of a media content item in a listing. In such examples, a query for one or more similar media content items may be generated for processing by the recommendation system 119, the generated query identifying one or more reference metadata tags associated with one or more reference media content items, such as the results of the search query or a selected content item.

Figure 10:
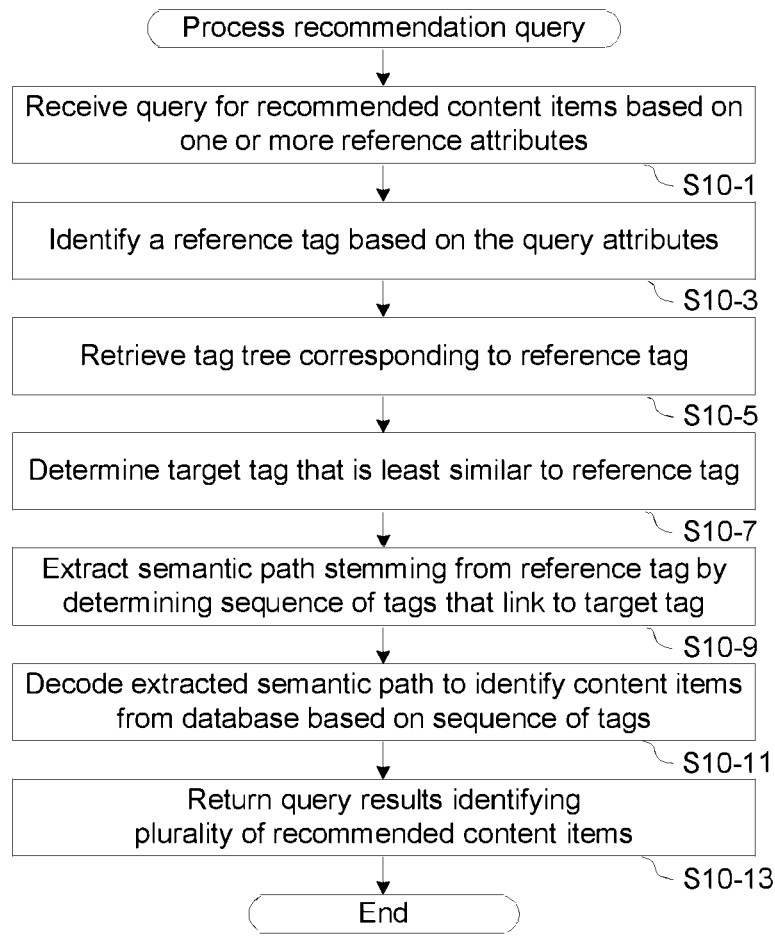
FIG. 10 is a flow diagram illustrating the processing steps of making content recommendations using the learned semantic flow data models.
Figure 11:
FIG. 11 shows an exemplary screenshot of a recommendation service implementing an embodiment of the invention.

FIG. 10 is a flow diagram illustrating a computer-implemented query handling process by the recommendation system 119 to resolve a query for recommended content items, in accordance with another embodiment, using the trained semantic flow model 117 to infer a plurality of recommended content items based on one or more attribute specified in the received query. As shown, the process begins at step S10-1 where the query handler 501 receives or generates a query for recommended content. For example, a query may be received from a media content receiver of a client device 105 that generates the recommendation query based on a user specified criteria, historical viewing data, and/or a selected content item, in order to output a plurality of selectable recommended content items via a user interface. As another example, the query handler 701 may be configured to generate a query for recommended content, the query identifying a reference content item 109, metadata 115 associated with a content item, or one of the unique metadata tags 115'. FIG. 11 shows an exemplary screenshot of a recommendation service that provides a search interface for user input of a content title, for example via input element 1101. In the illustrated example, the user has entered a search query of the content title "top gun". As shown, the example output result of processing a search for recommended content based on the input content title "top gun" consists of two sequences of inter-related recommended content items derived from respective extracted semantic paths 707 linking the determined pairs of contrasting semantic tags 303,709.

At step S10-3, the query handler 701 identifies a reference metadata tag 115' based on the received query attributes. In the example shown in FIG. 11, the query identifies the user input content title. In other examples, the query may identify one or more content items from a user's viewing history, or a content item that has been selected on a user interface of the client device 105. The query handler 701 can identify one or more metadata tags 115' associated with the content item(s), and select one or more as reference tags for respective recommendation query processing. As another example, the query itself may identify one or more reference metadata tags 115'. Referring again to the example of FIG. 11, the query handler 701 can retrieve, from the database 111, the metadata tags 115' associated with the content item or items identified by the input search query. All of the associated metadata tags 115' can be considered, by calculating a contrast value for each candidate pair of tags. A predefined number of candidate pairs having the highest contrast value can be selected as source-target tag pairs for semantic path processing. As shown in FIG. 11, the two highest contrasting pairs of tags are selected, with the first pair defined by source tag 303-4 "arms & weaponry action" and target tag 709-4 "father son drama", and the second pair defined by source tag 303-5 "gripping drama" and target tag 709-5 "action hero thriller".

At step S10-5, the semantic path extraction module 703 receives the, or each, reference metadata tag 115' as a source tag 705 for processing, and retrieves the data sub-structure of the corresponding tag tree 301 from the trained semantic flow model 117. If the query does not specify a target attribute, the semantic path extraction module 703 can determine, at step S10-7, a target metadata tag 709 that is least similar, or most dissimilar, to the identified source tag 705. At step S10-9, the semantic path extraction module 703 determines the sequence of metadata tags 115' that links the source tag 705 to the target tag 709 through the retrieved tag tree, the sequence of tags defining the semantic path 707 stemming from the identified source tag 705. At step S10-11, the tag decoder 711 of the recommendation system 119 decodes the extracted semantic path 707 by identifying, for each node along the extracted semantic path 707, one or more candidate content items 109 from the database 111 associated with the respective metadata tag 115' of that node. At step S10-13, the recommendation system 119 returns an output 713 including metadata 115 associated with the one or more content items 109 identified by the tag decoder 711 for each node in the semantic path 707, as a sequence of content recommendations that comprehensively spans a search space between two disparate context points. In this way, recommendation results computed from the semantic flow driven recommendation service not only covers contents which are similar to tags that are known to the queried content, i.e., "father son drama", "action hero thriller", "arms & weaponry action" and "gripping drama", as shown in FIG. 11, but advantageously surfaces contents from tags such as "black comedy", "young adult si-fi", etc, which are different from the tags known to the queried content. It is appreciated that such recommended contents and tags are not determined randomly, but are instead computationally determined and selected using the trained semantic flow model, which explicitly represents or encodes the semantic relationship between the recommended tags/contents and the queried tags/contents. As a result, the recommendation system 119 is able to provide better recommendation results that are surprising to customers because they cover a wider content diversity, thereby reducing the likelihood that none of the output results match the customer's subjective view of a good or suitable match. At the same time, the recommendation results will be convincing to customers because the associated semantic path offers explicit explanation about how the recommendation results derive from the input query.

Alternative Implementation Contexts

Figure 12A:
FIG. 12, which comprises FIGS. 12A and 12B, schematically illustrate alternative data structures for training a semantic flow model, according to another embodiment.
Figure 12B:
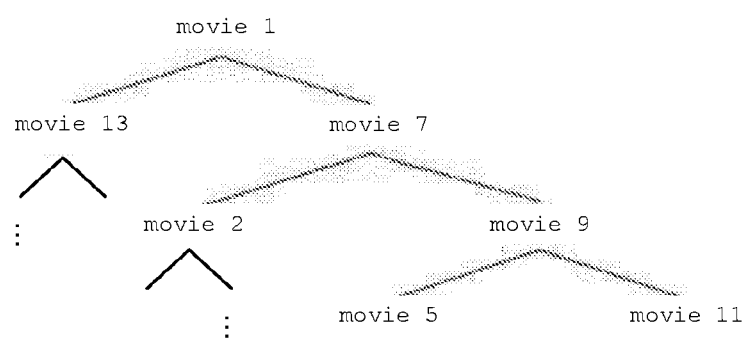

In the exemplary embodiments described above, the machine learning system 113 is configured to learn semantic similarity and semantic flow based on a set of unique metadata tags defined from genre descriptions associated with content items in the database. As those skilled in the art will appreciate, any other type of metadata tags could be used to learn the semantic flow model. For example, the metadata tags can be unique content identifiers, such as titles, and the training data may instead consist of samples of historical event data associated with an entity, such as a user's content consumption history as schematically illustrated in FIG. 12A. In this way, the data structure of the semantic flow model defines a calculated affinity between a reference content identifier and each other content identifier in the database, as schematically illustrated in FIG. 12B, based on the historical event data. Advantageously, the machine learning system can learn how content relates to each other based on user watch histories, enabling the recommendation system to determine and output recommended content items based on a collaborative filtering of the corpus of available content items according to the learned associations from what users have watched. By effectively swapping the metadata tag data 115' in the worked example of FIG. 3, with user data, the resulting semantic flow model 117 encodes a machine learned understanding of how content relates to each other based on user watch history.

Figure 13:
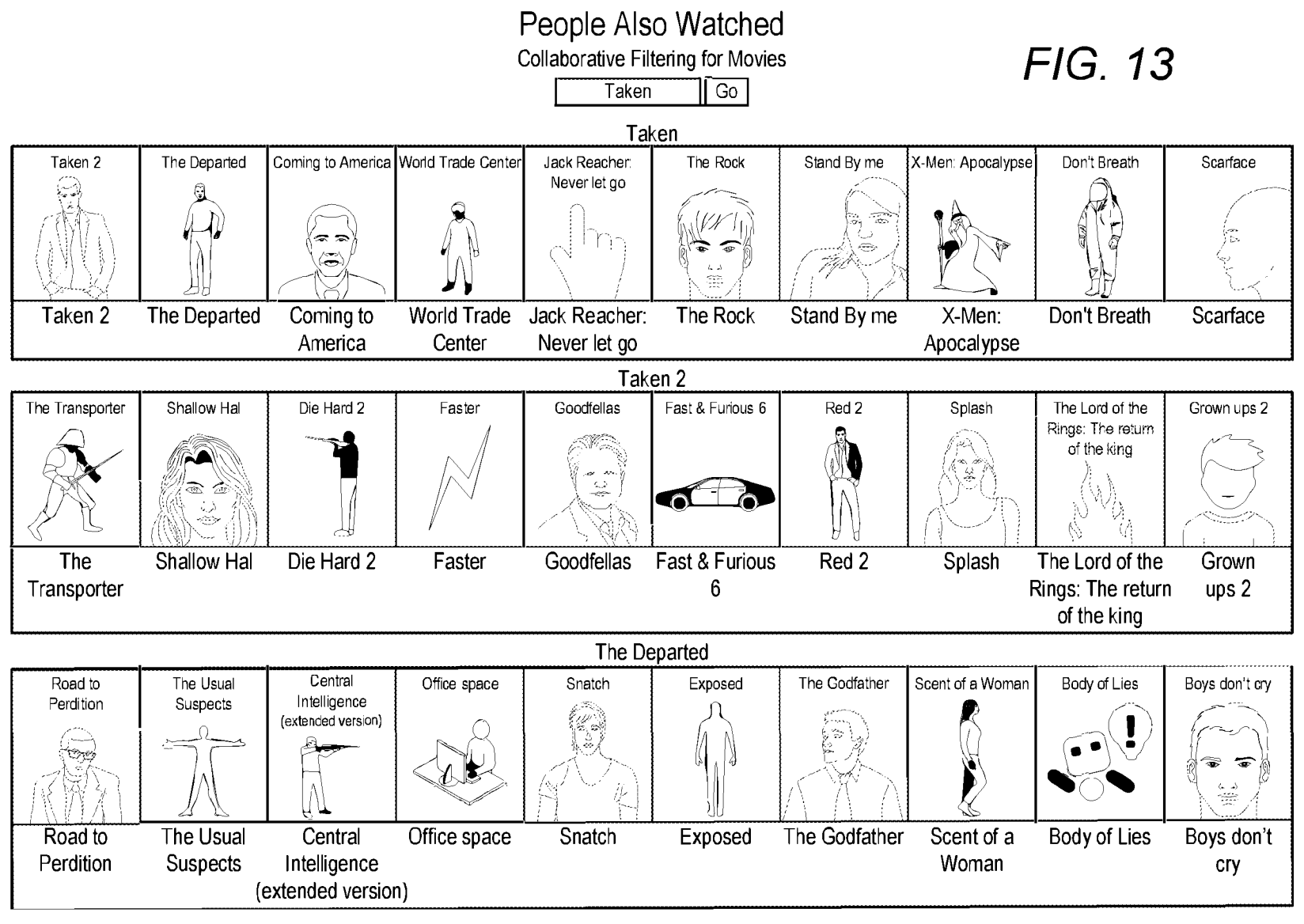

An example screenshot of such a recommendation service based on collaborative filtering is shown in FIG. 13, the feature named "People also watched . . . ". In this example, the received search enquiry identifies one source content title, "Taken". Based on this input title, a semantic flow/tree is learned and built from modelling of customer viewing history as illustrated in FIG. 12B. In FIG. 13, the first rail of the output results shows recommendations corresponding to ten content items from a first layer of the semantic tree 301 of the trained model 117 corresponding to the source title "Taken". In other words, the first rail shows ten contents which are most likely to watch by customers given they watched the movie "Taken". The second and third rails of the output results show contents from a second and third layer of the semantic tree 301 of the source title "Taken", respectively. For example, the second rail shows ten movies which are most likely to co-watch with the first movie in the first layer of the tree, i.e., "Taken 2" and the third rail shows ten movies which are most likely to co-watch with the second movie in the first layer of the tree, i.e., "The Departed".

For each title, the query handler 701 in this alternative implementation context would retrieve, from the database 111, all of the content titles and calculate contrast values for each candidate pair of titles, using the semantic flow model 117 as trained on user watch history data. The contrast values of each candidate pair of titles relative to each search input title can be summed to determine the defined number of highest contrasting pairs of titles, to determine a corresponding sequence of recommended content items spanning the respective pair of points.

Figure 14:
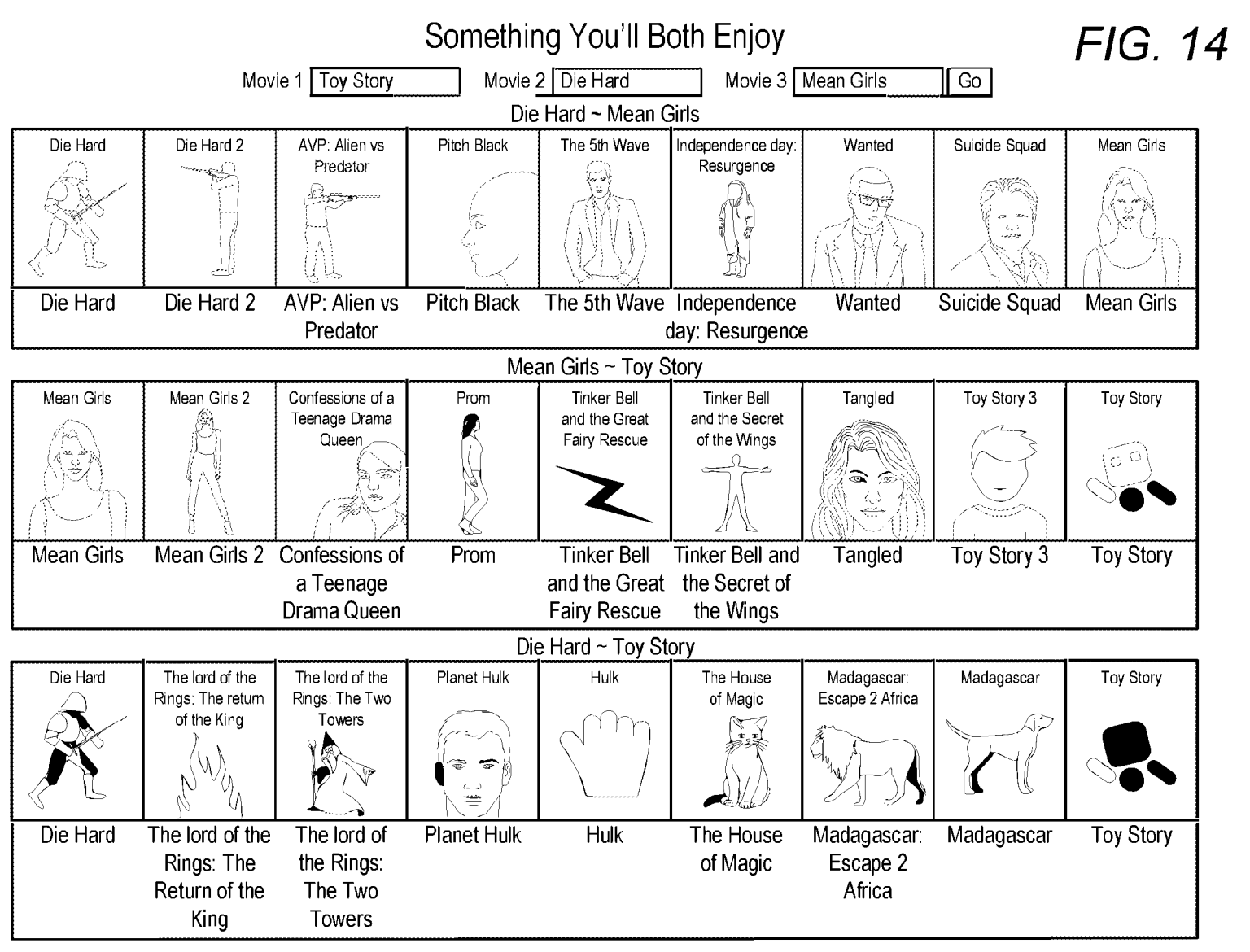

FIG. 14 shows an example screenshot of yet another alternative implementation context that creates recommendations based on a plurality of input content titles, for example each picked by a respective one of a group of viewers at a client device 105. By analysing the semantic flow between each pair of input content items, the recommendation system 119 can obtain a comprehensive series of recommendations spanning the search space between all input content items. Advantageously, this enables the system to identify and output search results that are not localised around the input search queries, and furthermore enables the system to output recommendations that cater to a group of viewers who have opposing preferences. In the example shown in FIG. 14, the recommendation system 119 determines among the plurality of recommendations, the movie "The $5^{th}$ Wave" (an action film with a female teenage lead), which lies in the contextual search space between the input criteria "Die Hard" (an action film) and "Mean Girls" (a teenage comedy).

Example Computer System Implementation

Figure 15:
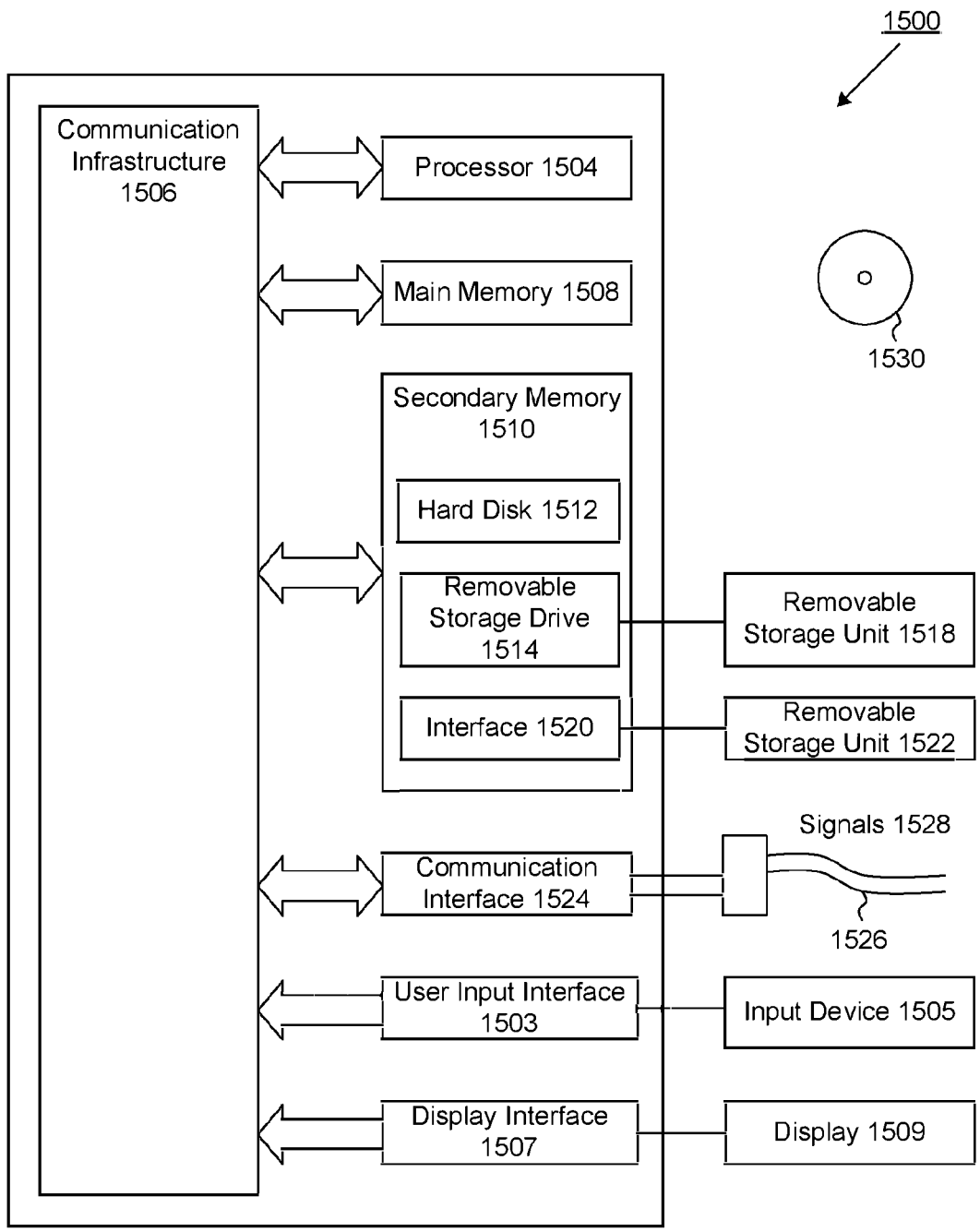
FIG. 15 is a diagram of an example of a computer system on which one or more of the functions of the embodiments may be implemented.

FIG. 15 illustrates an example computer system 1500 in which the present invention, or portions thereof, can be implemented as computer-readable code to program processing components of the computer system 1500. For example, the methods illustrated by the flowcharts of FIGS. 5 and 10 can be implemented in system 1500. The content service provider 103 and/or each of the machine learning system 113 and recommendation system 119 of FIG. 1 can also be implemented in system 1500. Various embodiments of the invention are described in terms of this example computer system 1500. After reading this description, it will become apparent to a person skilled in the relevant art how to implement the invention using other computer systems and/or computer architectures.

Computer system 1500 includes one or more processors, such as processor 1504. Processor 1504 can be a special purpose or a general-purpose processor. Processor 1504 is connected to a communication infrastructure 1506 (for example, a bus, or network). Computer system 1500 also includes a user input interface 1503 connected to one or more input device(s) 1505 and a display interface 1507 connected to one or more display(s) 1509, which may be integrated input and display components. Input devices 1505 may include, for example, a pointing device such as a mouse or touchpad, a keyboard, a touchscreen such as a resistive or capacitive touchscreen, etc. Computer system 1500 also includes a main memory 1508, preferably random access memory (RAM), and may also include a secondary memory 1510. Secondary memory 1510 may include, for example, a hard disk drive 1512, a removable storage drive 1514, flash memory, a memory stick, and/or any similar non-volatile storage mechanism. Removable storage drive 1514 may comprise a floppy disk drive, a magnetic tape drive, an optical disk drive, a flash memory, or the like. The removable storage drive 1514 reads from and/or writes to a removable storage unit 1518 in a well-known manner. Removable storage unit 1518 may comprise a floppy disk, magnetic tape, optical disk, etc. which is read by and written to by removable storage drive 1514. As will be appreciated by persons skilled in the relevant art(s), removable storage unit 1518 includes a non-transitory computer usable storage medium having stored therein computer software and/or data.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communications interface 1524. Communications interface 1524 allows software and data to be transferred between computer system 1500 and external devices. Communications interface 1524 may include a modem, a network interface (such as an Ethernet card), a communications port, a PCMCIA slot and card, or the like.

Various aspects of the present invention can be implemented by software and/or firmware (also called computer programs, instructions or computer control logic) to program programmable hardware, or hardware including special-purpose hardwired circuits such as application-specific integrated circuits (ASICs), programmable logic devices (PLDs), field-programmable gate arrays (FPGAs), etc. of the computer system 1500, or a combination thereof. Computer programs for use in implementing the techniques introduced here may be stored on a machine-readable storage medium and may be executed by one or more general-purpose or special-purpose programmable microprocessors. The terms "computer program medium", "non-transitory computer readable medium" and "computer usable medium" introduced herein can generally refer to media such as removable storage unit 1518, removable storage unit 1522, and a hard disk installed in hard disk drive 1512. Computer program medium, computer readable storage medium, and computer usable medium can also refer to memories, such as main memory 1508 and secondary memory 1510, which can be memory semiconductors (e.g. DRAMs, etc.). These computer program products are means for providing software to computer system 1500.

Computer programs are stored in main memory 1508 and/or secondary memory 1510. Computer programs may also be received via communications interface 1524. Such computer programs, when executed, enable computer system 1500 to implement the present invention as described herein. In particular, the computer programs, when executed, enable processor 1504 to implement the processes of the present invention, such as the steps in the methods illustrated by flowcharts of FIGS. 5 and 10, and the machine learning system 113 and recommendation system 119 of FIG. 1, described above. Accordingly, such computer programs represent controllers of the computer system 1500. Where the invention is implemented using software, the software may be stored in a computer program product and loaded into computer system 1500 using removable storage drive 1514, interface 1520, hard drive 1512, or communications interface 1524.

Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage device, etc.), and communication mediums (e.g., wired and wireless communications networks, local area networks, wide area networks, intranets, etc.).

Additionally, while illustrated as a single system, it is to be understood that the computing device 1500 may be a distributed system. Thus, for instance, several devices may be in communication by way of a network connection and may collectively perform tasks described as being performed by the computing device 1500. One example may be the distributed processing of the machine learning, query generation and query processing as described in the above embodiments.

Alternative Embodiments

It will be understood that embodiments of the present invention are described herein by way of example only, and that various changes and modifications may be made without departing from the scope of the invention.

It will be appreciated that although the respective processes and associated processing modules are described as separate embodiments, aspects of the described embodiments can be combined to form further embodiments. In addition, while the embodiments are described with reference to several block flow diagrams that illustrate example systems, it is understood that functionality that is described as being carried out by certain system components may be performed by multiple components. Similarly, for instance, a component may be configured to perform functionality that is described as being carried out by multiple components, and some steps in methodologies described herein may be omitted, re-ordered, or combined.

As yet another alternative, the machine learning system and recommendation system may be provided as one or more distributed computing modules or processing services on a remote server that is in communication with the content service provider and/or client device via the data network. Additionally, as those skilled in the art will appreciate, the described functionality may be provided as one or more application programming interface (API) accessible by an application program executing on the content provider system and/or the client devices, or as a plug-in module, extension, embedded code, etc., configured to communicate with an application program.

Yet further alternative embodiments may be envisaged, which nevertheless fall within the scope of the following claims.

The invention claimed is:

1. A computer-implemented method comprising:
storing trained weights of a neural network defining probability values indicative of machine-learned likelihood of association between each pair of a plurality of N metadata tags associated with content items in a media system, wherein the neural network is trained using training samples each having a feature vector defining the metadata tags associated with a corresponding content item;
storing a semantic data model defining N trees of nodes, each tree corresponding to a respective one of the plurality of N metadata tags and each arranged in a hierarchical structure, wherein the n-th tree of nodes has the n-th metadata tag as a root node and the remaining plurality of N-1 metadata tags as child nodes stemming from the root node based on the trained weights of the neural network, wherein as each tree is being generated starting from the respective root node, each child node to be attached to an immediate parent node is identified as the metadata tag having a greatest affinity to said immediate parent node among the remaining plurality of N-1 metadata tags, and each metadata tag is removed from the remaining plurality of N-1 metadata tags after being attached to the corresponding tree;
identifying a reference metadata tag and a target metadata tag, and determining the reference metadata tag as the m-th metadata tag among the N metadata tags;
retrieving the m-th tree of nodes having the reference metadata tag as a root node;
determining a sequence of nodes through the retrieved m-th tree from the root node to the node associated with the target metadata tag, the determined sequence defining a corresponding path through the plurality of metadata tags in the hierarchical structure of the m-th tree; and
identifying a plurality of content items to recommend based on the determined sequence of metadata tags, wherein at least one of the content items to recommend is associated with a metadata tag along the path between the reference metadata tag and the target metadata tag.

2. The method of claim 1, wherein each tree of nodes is generated by calculating an affinity between a root metadata tag of the plurality of metadata tags and each other metadata tag of the plurality of metadata tags based on the machine-learned likelihood of associations from the trained neural network.

3. The method of claim 1, wherein each feature vector comprises binary values each representative of the presence of a corresponding one of the plurality of metadata tags as defined for the content item.

4. The method of claim 2, wherein the semantic data model includes the calculated affinity for each edge between respective pairs of nodes in the trees.

5. The method of claim 1, wherein the associated metadata tags stemming from a root node are arranged in a hierarchical order from most similar to least similar to the metadata tag associated with the root node.

6. The method of claim 1, wherein the target metadata tag is determined as the metadata tag that is least similar to the reference metadata tag.

7. The method of claim 6, wherein the least similar metadata tag is calculated based on a depth level of the metadata tag in the retrieved tree of nodes.

8. The method of claim 6, wherein the least similar metadata tag is calculated based on a sum of calculated affinities of metadata tags along respective candidate paths through the retrieved tree of nodes.

9. The method of claim 1, wherein the sequence of nodes is determined by traversing the retrieved tree of nodes to determine the plurality of interconnected nodes that link the root node to a target node corresponding to the target metadata tag.

10. The method of claim 1, further comprising receiving a query for one or more content items, wherein the reference metadata tag is identified based on the received query.

11. The method of claim 10, wherein the query identifies a plurality of reference metadata tags, and wherein the method further comprises:
   determining, for each reference metadata tag, a candidate target metadata tag that is least similar to the reference metadata tag; and
   identifying the pair of reference and target metadata tags that are least similar, wherein the sequence of metadata tags is determined from the identified pair of least similar reference and target metadata tags.

12. The method of claim 10, wherein the query identifies a plurality of reference metadata tags, and wherein the method further comprises extracting a corresponding path that spans each pair of identified reference metadata tags.

13. The method of claim 10, wherein the query identifies a plurality of reference metadata tags, and wherein the method further comprises determining calculated affinities of all candidate pairs of unique metadata tags based on the retrieved tree of nodes, and extracting a path that spans from the pair of metadata tags determined as having the greatest contrast.

14. The method of claim 10, further comprising generating the query for one or more content items based on one or more identified content items, wherein the generated query identifies one or more reference metadata tags associated with the identified content items.

15. The method of claim 1, wherein the data structure comprises a binary tree of nodes.

16. The method of claim 1, further comprising generating a graphical user interface of a content receiver including user-selectable elements linked to content items based on the determined sequence of metadata tags.

17. The method of claim 1, wherein the steps are performed by a server and the plurality of recommended content items are transmitted to a remote client device for output on a display.

18. The method of claim 1, wherein the steps are performed by a client device and the tree of nodes is retrieved from a remote server.

19. A content recommendation system comprising:
a memory storing:
   trained weights of a neural network defining probability values indicative of machine-learned likelihood of association between each pair of a plurality of N metadata tags associated with content items in a media system, wherein the neural network is trained using training samples each having a feature vector defining the metadata tags associated with a corresponding content item; and
   a semantic data model defining N trees of nodes, each tree corresponding to a respective one of the plurality of N metadata tags and each arranged in a hierarchical structure, wherein the n-th tree of nodes has the n-th metadata tag as a root node and the remaining plurality of N-1 metadata tags as child nodes stemming from the root node based on the trained weights of the neural network, wherein as each tree is being generated starting from the respective root node each child node to be attached to an immediate parent node is identified as the metadata tag having a greatest affinity to said immediate parent node among the remaining plurality of N-1 metadata tags, and each metadata tag is removed from the remaining plurality of N-1 metadata tags after being attached to the corresponding tree; and
one or more processors configured to:
   identify a reference metadata tag and a target metadata tag, and determine the reference metadata tag as the m-th metadata tag among the N metadata tags;
   retrieve the m-th tree of nodes having the reference metadata tag as a root node;
   determine a sequence of nodes through the retrieved m-th tree from the root node to the node associated with the target metadata tag, the determined sequence defining a corresponding path through the plurality of metadata tags in the hierarchical structure of the m-th tree; and
   identify a plurality of content items to recommend based on the determined sequence of metadata tags, wherein at least one of the content items to recommend is associated with a metadata tag along the path between the reference metadata tag and the target metadata tag.

20. A non-transitory storage medium comprising machine readable instructions stored thereon that when executed cause a computer system to perform a method in accordance with claim 1.

* * * * *